US010942948B2

(12) United States Patent
Patel et al.

(10) Patent No.: US 10,942,948 B2
(45) Date of Patent: Mar. 9, 2021

(54) CLOUD-BASED PLUGGABLE CLASSIFICATION SYSTEM

(71) Applicant: SAP SE, Walldorf (DE)

(72) Inventors: Ashutosh Patel, Bangalore (IN); Rahul Seshagiri Srivatsa, Mysore (IN); Panish Ramakrishna, Bangalore (IN); Debashis Banerjee, Bengaluru (IN)

(73) Assignee: SAP SE, Walldorf (DE)

(*) Notice: Subject to any disclaimer, the term of this patent is extended or adjusted under 35 U.S.C. 154(b) by 309 days.

(21) Appl. No.: 15/584,195

(22) Filed: May 2, 2017

(65) Prior Publication Data

US 2018/0322185 A1 Nov. 8, 2018

(51) Int. Cl.
| | |
|---|---|
| *G06F 7/02* | (2006.01) |
| *G06F 16/00* | (2019.01) |
| *G06F 16/28* | (2019.01) |
| *G06F 16/35* | (2019.01) |
| *G06F 16/24* | (2019.01) |
| *G06F 16/9535* | (2019.01) |

(52) U.S. Cl.
CPC ............ *G06F 16/285* (2019.01); *G06F 16/35* (2019.01); *G06F 16/353* (2019.01); *G06F 16/358* (2019.01); *G06F 16/24* (2019.01); *G06F 16/9535* (2019.01)

(58) Field of Classification Search
CPC ...... G06F 16/285; G06F 16/35; G06F 16/358; G06F 16/353; G06F 16/9535; G06F 16/24; G06N 5/003; G06N 5/022; G06N 5/04
See application file for complete search history.

(56) References Cited

U.S. PATENT DOCUMENTS

| | | | | |
|---|---|---|---|---|
| 9,323,826 | B2* | 4/2016 | Bailey ................. | G06F 16/95 |
| 9,785,705 | B1* | 10/2017 | Cartright ............. | G06F 16/35 |
| 10,528,329 | B1* | 1/2020 | Doyle ................. | G06F 8/31 |
| 2007/0214099 | A1* | 9/2007 | Marfatia .............. | G06F 8/51 |
| | | | | 706/20 |
| 2011/0191270 | A1* | 8/2011 | Peng .................. | G06N 5/04 |
| | | | | 706/10 |
| 2015/0046300 | A1* | 2/2015 | Menipaz ............. | G06Q 10/087 |
| | | | | 705/28 |
| 2015/0058349 | A1* | 2/2015 | Ramnani ............. | G06F 16/35 |
| | | | | 707/740 |
| 2016/0225370 | A1* | 8/2016 | Kannan .............. | G10L 15/005 |
| 2016/0364810 | A1* | 12/2016 | Yang ................. | G06Q 50/01 |
| 2017/0109786 | A1* | 4/2017 | Park .................. | G06F 16/901 |
| 2017/0193389 | A1* | 7/2017 | Thomas .............. | G06N 5/046 |
| 2017/0242863 | A1* | 8/2017 | Dorairajan ........... | G06F 40/169 |
| 2018/0060302 | A1* | 3/2018 | Liang ................. | G06F 16/35 |

* cited by examiner

*Primary Examiner* — Bruce M Moser
(74) *Attorney, Agent, or Firm* — Schwegman Lundberg & Woessner, P.A.

(57) ABSTRACT

Example embodiments for classification are described. In an example embodiment, a request including a text term to be classified is received from a source system via a communication network at a computer system. A rule associated with the text term is accessed, in which the rule indicates at least one classifier of a plurality of classifiers installed at the computer system. Classification information for the text term is generated at the computer system using the at least one classifier indicated by the rule. The generated classification information includes a classification selected from a taxonomy by the at least one classifier. The generated classification information is transmitted via the communication network to the source system.

20 Claims, 9 Drawing Sheets

| INV AMT | SUPPLIER | PART KEY 1 | PART KEY 2 | INV DESCRIPTION |
|---|---|---|---|---|
| 18.77 | COMPU | Z19235 | 483561 | ADMIN – COMP... |
| 48.49 | ABC CORP | PR M410 | 224-8104 | (PROJECTORS)... |
| 46.19 | ABC CORP | LT T410 | 433710U | (XYZ OPTIONS ... |
| 27.10 | ABC CORP | LT T410 | 2537H42 | (XYZ THINKER ... |
| ... | ... | ... | ... | ... |

| INV AMT | SUPPLIER | PART KEY 1 | PART KEY 2 | INV DESCRIPTION | T. ID | D. CODE | T. DESC. | CONF | MAP |
|---|---|---|---|---|---|---|---|---|---|
| 18.77 | COMPU | Z19235 | 483561 | ADMIN – COMP... | 109905 | 93.14.19.. | LAND A... | LOW | MAN... |
| 48.49 | ABC CORP | PR M410 | 224-8104 | (PROJECTORS)... | 103939 | 41.11.17.. | PROJE... | MED | MAN... |
| 46.19 | ABC CORP | LT T410 | 433710U | (XYZ OPTIONS ... | 104845 | 43.21.15.. | NOTEB... | HIGH | MAN... |
| 27.10 | ABC CORP | LT T410 | 2537H42 | (XYZ THINKER ... | 104847 | 43.21.15.. | LAPTOP.. | HIGH | MAN... |
| ... | ... | ... | ... | ... | ... | ... | ... | ... | ... |

CLOUD-BASED PLUGGABLE CLASSIFICATION SYSTEM

BRIEF DESCRIPTION OF DRAWINGS

The present disclosure is illustrated by way of example and not limitation in the figures of the accompanying drawings, in which like reference numbers indicate similar elements.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
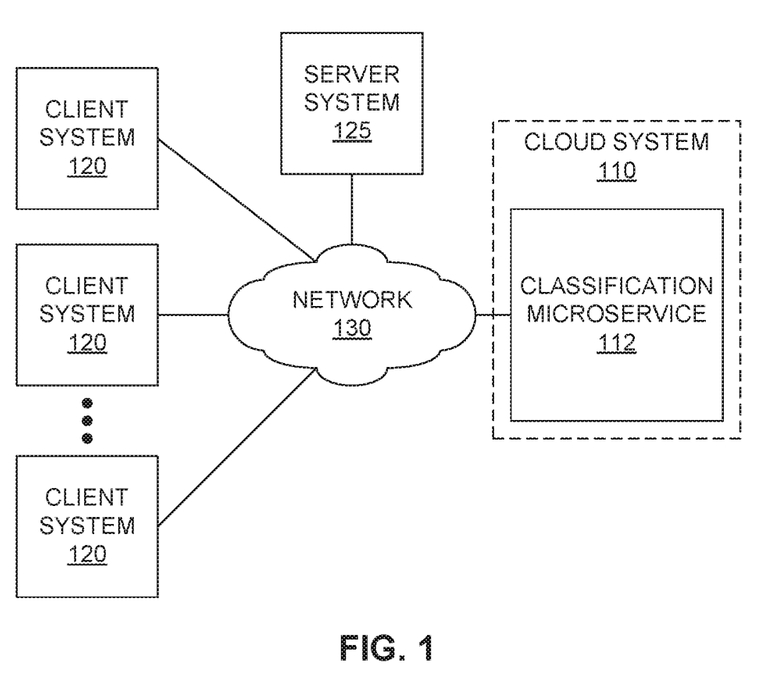
FIG. 1 is a block diagram of an example cloud system providing classification for either or both client systems and server systems.

FIG. 1 is a block diagram of an example cloud system 110 employable for classifying data, such as textual data that represents or describes one or more physical items, ideas, objects, or other items or elements to be classified. In the particular example embodiments described herein, the classification is performed by a classification microservice 112 provided by, or executed on, the cloud system 110. In some example embodiments, a microservice is a relatively focused or "fine-grained" service employing a lightweight communication protocol to perform a particular function (e.g., classification) that may be accessed by multiple applications or other services via communication connection, such as over a communication network 130. However, the cloud system 110 may also provide the classification function via other software architectures, such as a standalone application.

Also in an example embodiment, the cloud system 110 may include one or more server computer systems, database systems, and other computing or communication systems employable in a cloud-based system that is accessible via the communication network 130. In example embodiments, the communication network 130 may include one or more of a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof.

In example embodiments, the cloud system 110 may service requests for classification of one or more text terms received from one or more client systems 120 via the communication network 130. For example, the client systems 120 may include desktop computers, laptop computers, tablet computers, smart phones, and other computing or communication devices. In some example embodiments, the client systems 120 may be configured to access the cloud system 110 by way of a web browser, a dedicated client application (e.g., via an application programming interface (API)), or other means to provide one or more items for classification, and to receive classification information for those one or more items, such as by way of a graphical user interface (GUI).

Also in example embodiments, the classification requests may be received at the cloud system 110 via the communication network 130 from one or more server systems 125. For example, a server system 125 may execute an application or service (e.g., a business-to-business (B2B) system (e.g., a purchaser system, a customer system, a spend analysis system, a supply chain management system, etc.), such as SAP Ariba®) being accessed by one or more of the client systems 120 that requests classification of one or more items, ideas, objects, and so on.

In example embodiments described more fully below, each of the items, objects, ideas, or other classifiable elements are represented as a text term, which is a word, phrase, or other textual item representing a particular classifiable element. Such a text term may be in one or more languages, such as English, German, French, Spanish, and so on. However, other types of data (e.g., numbers, images, video clips, audio clips, and so on) may be employed as elements that may be classified by employing various aspects of the example embodiments described below.

In at least some of the example embodiments discussed herein, multiple classifiers representing different classification algorithms or technologies, accessing different databases, and/or exhibiting other differences, may be installed within a framework provided in the cloud system 110 (e.g., as part of the classification microservice 112) to service classification requests from client systems 120 and/or server systems 125. Each of the classifiers may be installed or "plugged-in" to the framework, such as by way of an identifiable interface (e.g., an API), so that a user of a client system 120 or server system 125 may select from among the multiple classifiers to perform the desired classification of one or more elements. In some example embodiments, more than one classifier may be employed to perform the classification of a particular element. Other aspects and characteristics of these example embodiments will be apparent in view of the following discussion.

Figure 2:
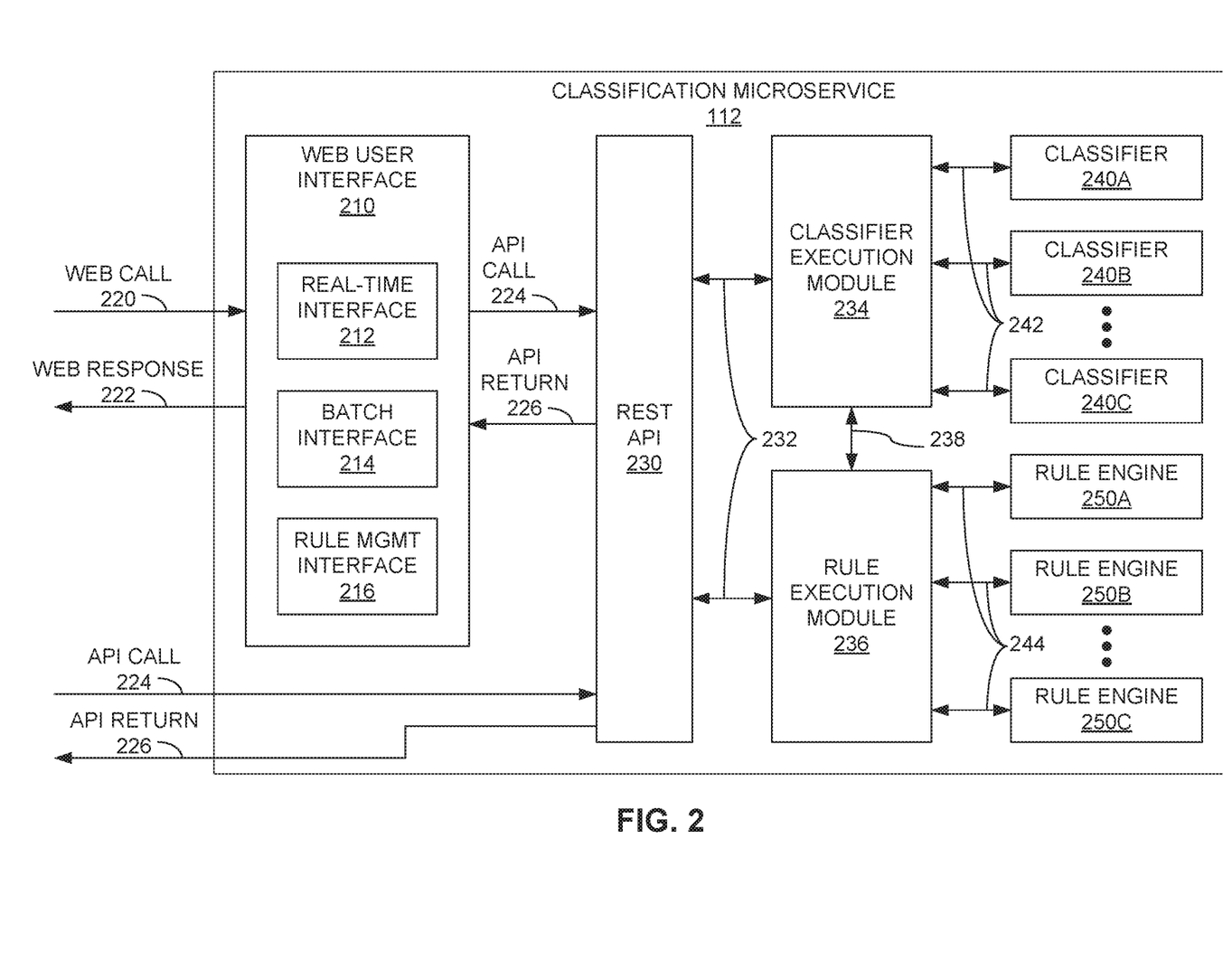
FIG. 2 is a block diagram of an example classification microservice employable in the cloud system of FIG. 1.

FIG. 2 is a block diagram of an example embodiment of the classification microservice 112 of the cloud system 110 of FIG. 1. In this example embodiment, the classification microservice 112 may include a web user interface 210, a representational state transfer (REST) API 230, a classifier execution module 234 into which multiple classifiers 240A, 240B, 240C (collectively, classifiers 240) may be installed, and/or a rule execution module 236 coupled with multiple rule engines 250A, 250B, and 250C (collectively, rule engines 250). Further, in an example embodiment, the web user interface 210 may include a real-time interface 212, a batch interface 214, and/or a rule management interface 216.

Other modules or components may be included in the classification microservice 112 or the cloud system 110, but are not explicitly depicted in FIG. 2 to simplify and focus the following discussion. Also, in some example embodiments, the classification microservice 112 or the cloud system 110 may include greater or fewer numbers of modules, some modules may be combined, and/or some modules may be divided into greater numbers of modules.

The web user interface 210, in an example embodiment, may receive web calls 220 via the communication network 130 that include commands or requests to be processed by the classification microservice 112. In an example embodiment, a web call 220 may include a Hypertext Transfer Protocol (HTTP) document (e.g., an inline frame, or "iframe"). In some example embodiments, the web call 220 may include information provided at a client system 120 or server device 125 via a web form supplied by the classification microservice 112. In response to the web call 220, the classification microservice 112 may generate and transmit a web response 222 providing information requested in the corresponding web call 220, status regarding the web call 220, and the like. In an example embodiment, the web calls 220 and associated web responses 222 may be generated and received at a client system 120 by way of a web browser or similar application executing at the client system 120.

In an example embodiment, each web call 220 may be processed in part by the real-time interface 212, the batch interface 214, or the rule management interface 216 of the web user interface 210. For example, the real-time interface 212 may process web calls 220 that include a request to classify a given text term provided in the web call 220. Correspondingly, the batch interface 214 may process web calls 220 that include a request to classify a plurality of given text terms provided in the web call 220. The rule management interface 216 may process web calls 220 that change or update one or more of the rule engines 250 that influence the operation of the classifier execution module 234 by way of the rule execution module 236. In a particular example, the web user interface 210 may be implemented using a front-end web application framework, such as the AngularJS® JavaScript-based open-source framework.

In example embodiments, the real-time interface 212, the batch interface 214, and the rule management interface 216 convert each received web call 220 into one or more API calls 224 to be received by the REST API 230. In an example embodiment, an API call 224 may include a data structure or object conforming to a particular data interchange format (e.g., JavaScript Object Notation (JSON)) that is compatible with the REST API 230. Correspondingly, the real-time interface 212, the batch interface 214, and the rule management interface 216 may convert each received API return 226 (e.g., another JSON object) generated by the REST API 230 in response to a received API call 224 into a corresponding web response 222.

In addition to exchanging API calls 224 and API returns 226 with the web user interface 210, the REST API 230 may also exchange API calls 224 and API returns 226 more directly with a client system 120 or server system 125 via the communication network 130, thus circumventing the web user interface 210 and the interfaces 212-216 implemented therein. In an example embodiment, the client system 120 or server system 125 may be executing an application (e.g., a desktop, laptop, or mobile application) or service that communicates with classification microservice 112 using the REST API 230. In an example embodiment, the REST API 230 may be developed using the Pivotal® Spring (or Spring Boot) open-source programming model for RESTful Java Virtual Machine (JVM)-based systems.

Both the classifier execution module 234 and the rule execution module 236 may exchange communications 232 with the REST API 230, such as by way of receiving commands from, and providing return information and status to, the REST API 230 in response to the received API calls 224. In an example embodiment, such commands received via the classifier execution module 234 may include requests to classify one or more text terms. Moreover, one or more rules, as interpreted and/or implemented by the rule execution module 236, may govern the processing of the classification requests. In an example embodiment, the classifier execution module 234, in receiving a classification request, may exchange communications 242 with one or more of the classifiers 240 to classify the one or more text terms received. Also in some example embodiments, the classifier execution module 234 may exchange communications 238 with the rule execution module 236 to determine which one or more of the classifiers 240 are to be used in performing the requested classification. Also in some example embodiments, the classifier execution module 234 may consult with the rule execution module 236 to determine whether some exceptional processing of a particular classification request is to be performed, such as to return particular predetermined classification information in response to the current classification request, thus circumventing the use of the classifiers 240.

The classifier execution module 234 may be configured in some example embodiments to process either or both real-time (or interactive) classification requests (e.g., those requests that may involve the classification of a single text term) and batch mode classification requests (e.g., those requests that may involve the classification of multiple text terms concurrently). The received request may indicate which type of classification request is to be performed based on whether one or multiple text terms are provided in the request.

Also in some example embodiments, the classifier execution module 234 may be configured to employ multiple classifiers 240 when classifying one or more text terms. In such examples, the classifier execution module 234 may communicate with the rule execution module 236 to determine which of the multiple classifiers 240 are to be employed to classify the one or more text terms. Also in example embodiments, the rule execution module 236 may indicate whether the particular multiple classifiers 240 are to be employed in a parallel manner, in a serial manner, or some combination thereof. In employing multiple classifiers 240 in parallel, the classifier execution module 234 may provide the same one or more text terms to each classifier 240, receive classification results from each of the employed classifiers 240, and generate and return classification information based on those results.

In example embodiments in which multiple classifiers 240 are to be used serially (e.g., in a "chained" manner), the rule execution module 236 may provide the classifier execution module 234 with an execution order in which the classifiers 240 are employed to classify the one or more text terms. Additionally, in implementing multiple classifiers 240 serially, the classifier execution module 234 may provide the one or more text terms to a first classifier 240, receive classification results from the first classifier 240, provide the one or more text terms (possibly along with classification results from the first classifier 240) to a second classifier 240. Continuing in this fashion, employing each of the classifiers 240 in the execution order provided by the rule execution module 236, the classifier execution module 234 may provide the classification results from the immediately preceding classifier 240, along with the one or more text terms, to the next classifier 240 according to the execution order. Once the last of the classifiers 240 according to the execution order is used, the classifier execution module 234 may generate and return classification information for the one or more text terms based on the classification results from the last classifier 240.

Each classifier 240 installed in the classification microservice 112 may be viewed as a pluggable module that provides an interface (e.g., an API) employable by the classifier execution module 234 to pass the one or more text items to be classified, and to receive the classification results generated by the classifier 240 that indicates a particular classification in which the text item belongs, as determined by the classifier 240. Each classifier 240, in example embodiments, may be quite different in terms of the particular algorithms, technology, databases, taxonomies, and other instructions or data employed thereby compared to other classifiers 240. For example, one or more classifiers 240 may be configured to work with data generated by particular processing systems, such as the SAP Ariba® business system (e.g., the Ariba Data Enrichment (ADE) classifier) and the SAP HANA® database management system (DBMS). Other classifiers 240 installed in the same classification microservice 112 may employ learning systems (e.g., neural networks, such as a convolutional neural network (CNN)), which may employ a modeling language (e.g., Natural Modeling Language (NML)) and more specialized execution languages and/or libraries (e.g., Tensor-Flow™, Python-based SciPy (for scientific calculations, including NumPy for array, linear algebra, and other advanced mathematic calculations employable in a scientific context), and so on). Other types of classifiers 240 handling a variety of data types and taxonomies, such as business data, scientific data (e.g., biological data, medical data, and the like), linguistic data (e.g., contractual language data), and more are also possible. In some example embodiments, a classifier 240 may select a classification for a text term from a taxonomy (e.g., a hierarchical taxonomy) stored within a data store (e.g., a database) that is located in, or accessible by, the cloud system 110.

Consequently, in some example embodiments in which a wide variety of classifiers 240 are installed, the classification microservice 112 may possess the capability to service a number of different types of classification requests. Some classification requests, for example, may provide a description of one or more products that have been purchased by members of a particular organization to facilitate an analysis of the amount of money spent in each of multiple product classifications. Other classification requests may provide a description of products from multiple wholesalers that are offered via a particular distributor. Each of the wholesalers may employ its own, varied descriptions or nomenclature for those products, so the distributor may desire to classify those product descriptions according to the distributor's particular taxonomy. In yet another example, a company may employ a contract language taxonomy approved by its legal department. Consequently, an employee attempting to generate a draft sales agreement may employ a proposed contract clause as a text term to be classified, and a classifier 240 may return an approved clause in response. Many other types of classification requests may be serviced by the classification microservice 112 in other example embodiments, based in part on the number and type of classifiers 240 provided.

The rule execution module 236, in an example embodiment, may be configured to employ one or more rule engines 250 by way of exchanging communications 244 therewith (e.g., via an API) to perform a number of functions. For example, in response to a command to install or update a particular rule engine 250 received via the REST API 230, the rule execution module 236 may perform the requested command using data in the command, such as an identification of the particular rule engine 250 and the associated installation or update.

Also in an example embodiment, the rule execution module 236 may be configured to communicate with the classifier execution module 234 to control the classification of one or more text terms based on the one or more particular rule engines 250 applicable to those text terms. For example, the rule execution module 236 may receive an indication from the classification request via the classifier execution module 234 indicating the particular text term to be classified, a particular data type of the text term, the particular client system 120 or server system 125 that sourced the classification request, a particular organization associated with the client system 120 or server system 125, and/or some other indication. Based on that indication, the rule execution module 236 may employ one or more of the rule engines 250 to control the operation of the classifier execution module 234 with respect to that text term.

The rule execution module 236 may control the operation of the classifier execution module 234 in a number of ways. In an example embodiment, the rule execution module 236, for a particular classification request, may cause the classifier execution module 234 to employ one or more particular classifiers 240, and may indicate whether the classifiers 240 are to be used in series or parallel, as well as a particular order in which the classifiers 240 are to be employed.

In some example embodiments, the rule execution module 236 may cause specialized processing of a particular classification request based on a command previously provided (e.g., by a user of a client system 120 sourcing the classification request). For example, in response to classification information generated for a particular request, a user may manually indicate to the classifier execution module 234 or the rule execution module 236 (e.g., via the web user interface 210 and/or the REST API 230) that the generated classification for the associated text term is to be changed to another classification. In response to such a change, the rule execution module 236 may update the one or more rule engines 250 associated with the classification request to return the user-indicated classification the next time a classification is requested for that same text term (or a similar text term).

In example embodiments, one or more rule engines 250 may correspond to, and thus control the operation of one or more particular classifiers 240. Additionally, in some example embodiments, the rule execution module 236 may employ one or more rule engines 250 in a manner corresponding to the classifiers 240 discussed above, such as by way of chaining the use of the rule engines 250 (e.g., providing an output of one rule engine 250 as an input to another rule engine 250).

One or more of the rule engines 250, in an example embodiment, may be configured to implement particular rules (e.g., business rules) governing the use of the classifiers 240 by the classifier execution module 234 in classifying one or more text terms, as described above. In addition, one or more of the rule engines 250 may include rules that override or replace the classification information that would otherwise be generated by one or more of the classifiers 240 with some manually selected classification information. As with the classifiers 240, the rule engines 250 may be pluggable modules with which the Wile execution module 236 communicates (e.g., via an API).

Figure 3A:
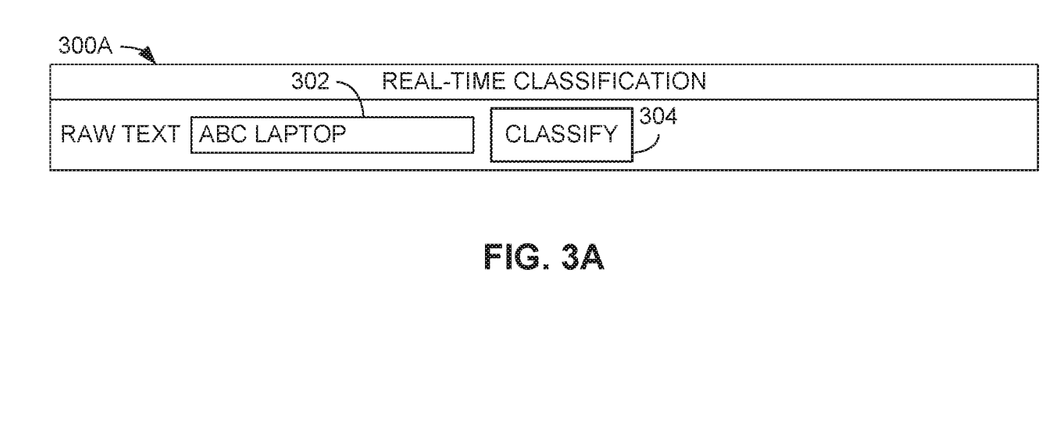
FIGS. 3A and 3B are graphical representations of a user interface employable for real-time or interactive classification of a text term employing the classification microservice of FIG. 2.
Figure 3B:
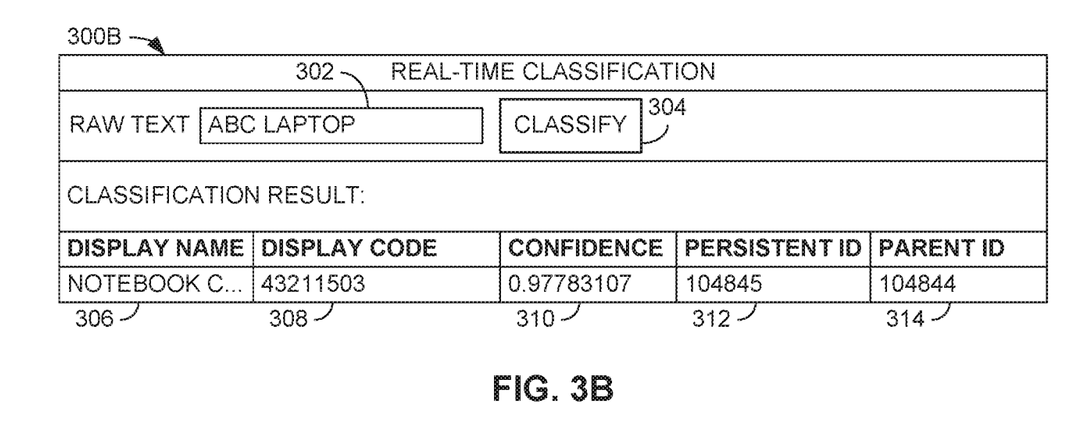

FIGS. 3A and 3B are graphical representations of a user interface 300 presented on a client system 120 and employable for real-time or interactive classification of a text term using the classification microservice 112 of FIG. 2. In one example embodiment, the user interface 300 is provided by way of a web browser executing on the client system 120 that has received a web form specifying the user interface 300. The web browser may thus employ web calls 220 and web responses 222 in communicating with the real-time interface 212 of FIG. 2. In another example embodiment, the user interface 300 is provided by way of an application executing on the client system 120 employing API calls 224 and API returns 226 in communicating with the REST API 230 of FIG. 2. In other example embodiments, the client system 120 may communicate with the classification microservice 112 by way of a server system 125 that employs API calls 224 and API returns 226 in communicating with the REST API 230.

As depicted in FIG. 3A, the user interface 300A provides a text entry box 302 into which a text term may be entered. In this particular example, the user has entered the term "ABC LAPTOP", which may be a description of a particular purchasable product. After entry of the text term, the user may then initiate a classification request by selecting a "classify" button 304. In response to the user selecting the classify button 304, the client system 120 may provide the user interface 300B of FIG. 3B, in which classification information generated and transmitted by the classification microservice 112, as described above, is displayed to the user. In this example embodiment, the classification information includes a display name 306 ("Notebook Computer") for a selected classification, a display code 308 (43211503), a confidence level 310 (0.97783107), a persistent identifier 312 (104845), and a parent identifier 314. In example embodiments, the display name 306 is a textual description of the classification selected by the classification microservice 112 for the text term, while the display code 308 is a numerical indicator for that textual representation. The confidence level 310, in an example embodiment, is an indication (e.g., numerical, textual, graphical, or the like) of a relative confidence level or probability that the selected classification is corrected relative to other classifications of a taxonomy from which the classification was selected. In this particular example embodiment, the confidence level 310 is depicted as a probability (e.g., a number from 0 to 1) that the selected classification is correct. In this case, the indicated confidence level 310 is very high (almost 1). Also in example embodiments, the persistent identifier 312 is an identifier for the selected classification, while the parent identifier 314 may be an identifier of a parent classification for the selected classification in a hierarchical taxonomy. Greater or fewer data items may be displayed as classification information via the user interface 300B in other example embodiments.

While the user interface 300B of FIG. 3B displays a single classification selection, multiple possible classification selections may be displayed in other example embodiments. For example, if the classification microservice 112 identifies several possible classifications for the text term, each of which is associated with a relatively low or moderate confidence level 310, two or more of the possible classifications may be displayed via the user interface 300B. Moreover, in some example embodiments, the user interface 300B may provide a selectable means by which the user may select one of the displayed classifications. In addition, in response to such a selection, the rule execution module 236 may modify or update a respective rule engine 250 such that subsequent classification requests for the same (or similar) text term may result in presentation of the selected classification with a higher confidence level 310, in some example embodiments.

Figure 4A:
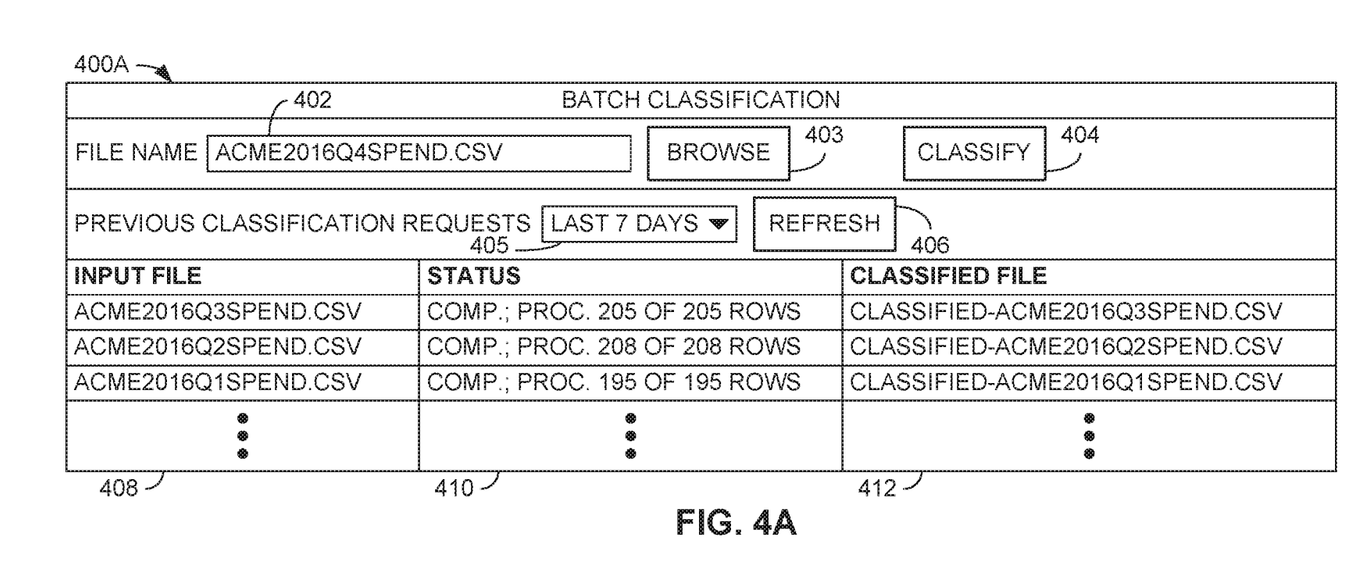
FIGS. 4A and 4B are graphical representations of a user interface employable for batch classification of multiple text terms employing the classification microservice of FIG. 2.
Figure 4B:
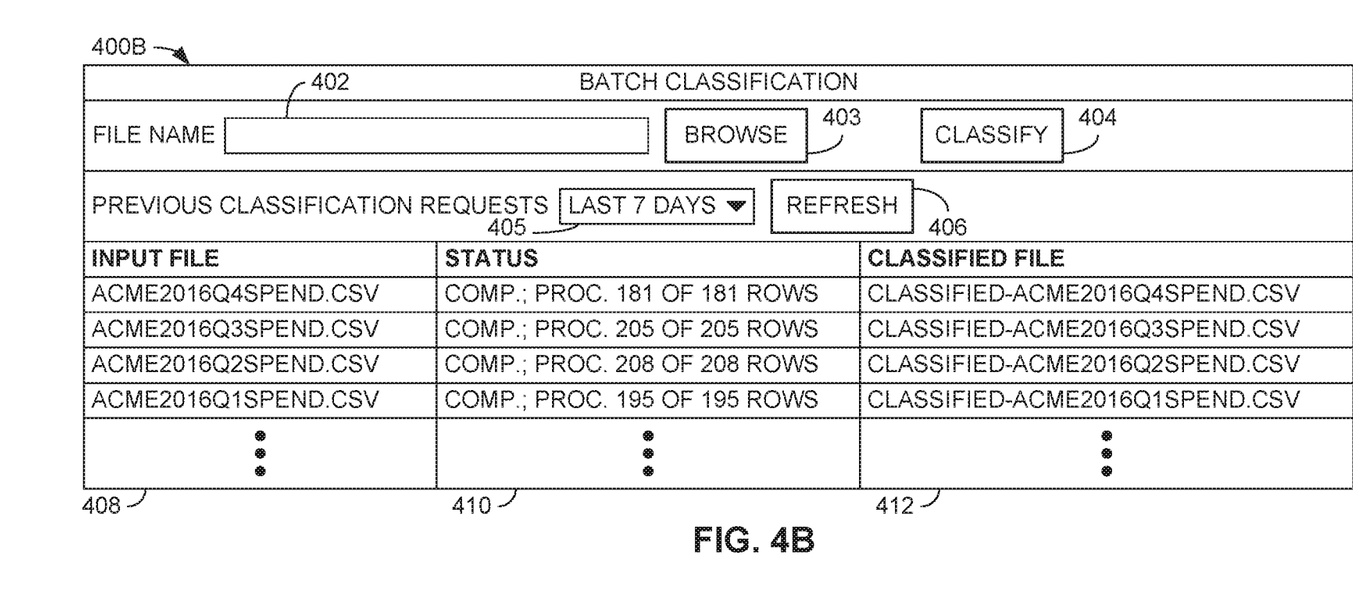

FIGS. 4A and 4B are graphical representations of a user interface 400 presented on a client system 120 and employable for batch classification of multiple text terms utilizing the classification microservice 112 of FIG. 2. In an example embodiment, in a manner similar to the user interface 300 of FIGS. 3A and 3B, the user interface 400 is provided by way of a web browser executing on the client system 120 that has received a web form specifying the user interface 400. The web browser may thus employ web calls 220 and web responses 222 in communicating with the batch interface 214 of FIG. 2. In another example embodiment, the user interface 400 is provided by way of an application executing on the client system 120 employing API calls 224 and API returns 226 in communicating with the REST API 230 of FIG. 2. In other example embodiments, the client system 120 may communicate with the classification microservice 112 by way of a server system 125 employing API calls 224 and API returns 226 in communicating with the REST API 230.

As depicted in FIG. 4A, the user interface 400A provides a file name text entry box 402 into which a file name (e.g., ACME2016Q4SPEND.CSV) may be entered for a file that includes multiple text terms. In example embodiments described herein, the input file may be a comma-separated value (CSV) file, although other file formats may be employed in other example embodiments. To facilitate entry of the file name, the user interface 400A may include a "browse" button 403 that, when selected by the user, causes the user interface 400A to display a window (not illustrated in FIG. 4A) presenting file names of files stored on, or accessible by, the client system 120 that may be selected for expedited insertion into the file name text entry box 402. Once a file name has been selected for the file name text entry box 402, the user may activate a "classify" button 404 to initiate transmission of the file as part of a classification request to the classification microservice 112 of the cloud system 110.

In an example embodiment, the user interface 400A may also display information regarding previous classification requests submitted via the client system 120 to the classification microservice 112. In this example, the user has selected an item ("Last 7 Days") from a dropdown menu 405 and activated a "refresh" button 406, causing display of information regarding the classification requests that the classification microservice 112 has processed over the selected time period. Also in this example, the information for each of the processed requests includes an input file name 408 of the file that includes the text terms that were classified, a most recent status 410 of the request, and an output file name ("classified file") 412 of the file that includes the classification information for the text terms. In the particular example embodiment of FIG. 4A, the status 410 for each of the previous requests indicates that the classification is complete, and indicates the number of rows (e.g., the number of text terms) of the file that were processed. While a particular request is awaiting to be processed or is currently being processed, in some example embodiments, the status 410 may reflect that particular status. Also in some example embodiments, the output file name 412 may be an augmented version of the input file name 408 (e.g., CLASSIFIED ACME2016Q3SPEND.CSV versus ACME2016Q3SPEND.CSV). Moreover, the file having the output file name 412 may include at least some of the same information as the file having the input file name 408, as described below in conjunction with FIGS. 5A and 5B.

After the requested classification information for the input text file of FIG. 4A (e.g., ACME2016Q4SPEND.CSV) is generated by the classification microservice 112 and transmitted to the client system 120, the client system 120 may display the user interface 400B of FIG. 4B. Therein, the current classification request for the ACME2016Q4SPEND.CSV input file name 408 is shown in the current status 410 as completed, having processed all 181 rows therein, and providing the output file name 412 as CLASSIFIED-ACME2016Q4SPEND.CSV. In an example embodiment, the file name text entry box 402 is cleared once the user has activated the classify button 404 and the transmission of the associated classification request to the classification microservice 112 has occurred.

Figure 5A:
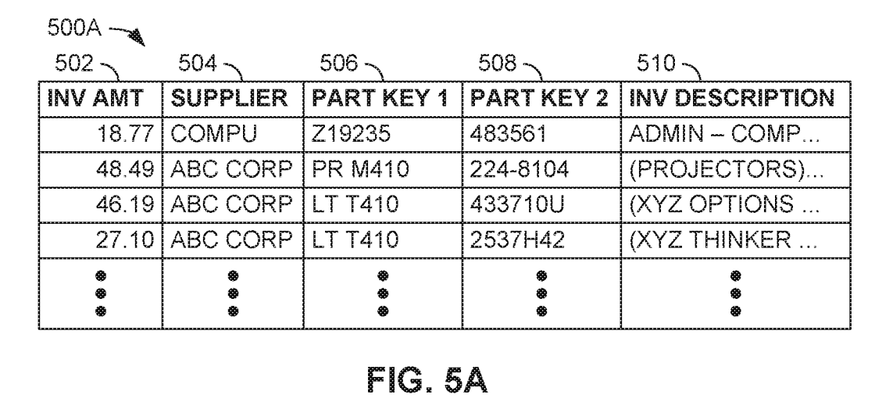
FIG. 5A is a graphical representation of an example input file employable in the batch classification depicted in FIGS. 4A and 4B.

FIG. 5A is a graphical representation 500A of an example input file employable in the batch classification depicted in FIGS. 4A and 4B. In both this example embodiment and the example embodiment of the output file depicted in FIG. 5B, the files are illustrated as tables for ease of consumption, although the files are CSV files, as described above in conjunction with FIGS. 4A and 4B. As shown in the example embodiment of FIG. 5A, each text term to be classified is identified as an invoice description 510 of a particular item that has been purchased. In addition, each invoice description 510 may be accompanied by supplemental information that may be helpful to one or more of the classifiers 240 in generating classification information for the text item denoted by the invoice description 510. In the example embodiment of FIG. 5A, the supplemental information includes an invoice amount 502, a supplier name 504, a first part key 506, and second part key 508 (e.g., part numbers for the invoice item that has been purchased). In other example embodiments, greater or fewer data items of supplemental information may be included in the input file 500A.

Figure 5B:
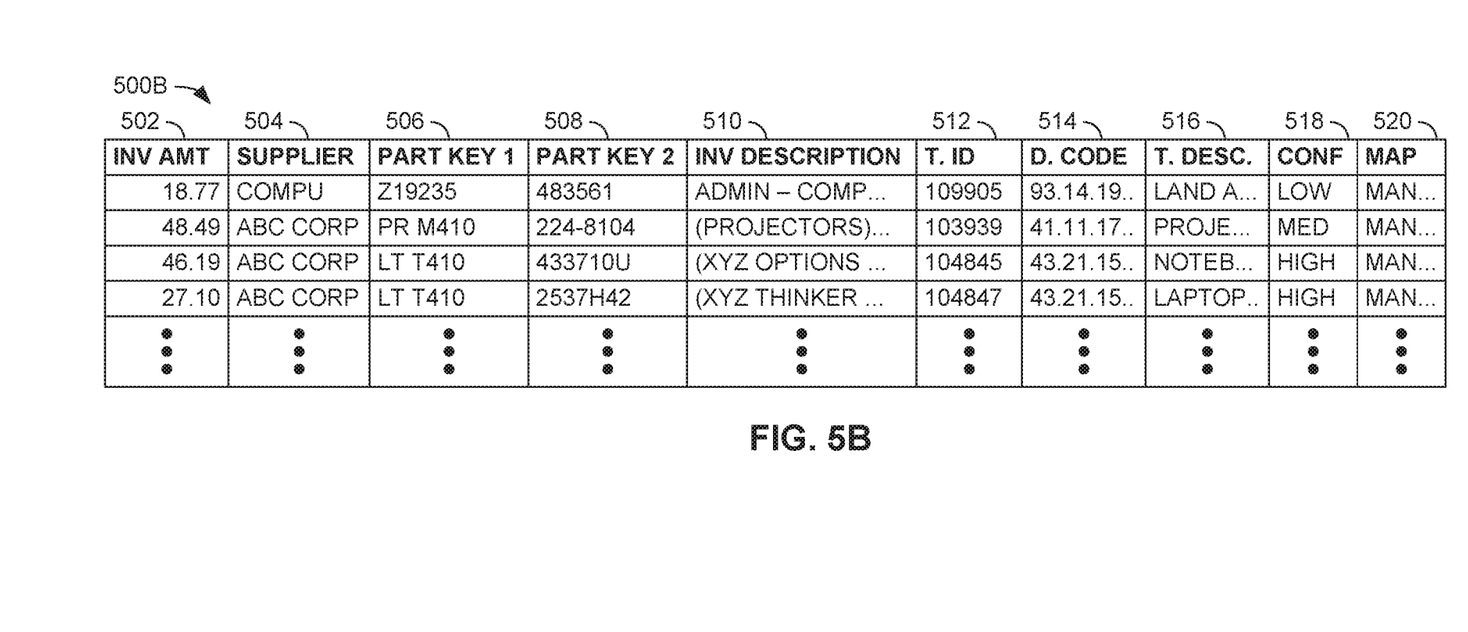
FIG. 5B is a graphical representation of an example output file generated by the batch classification depicted in FIGS. 4A and 4B.

FIG. 5B is a graphical representation of an example output file 500B generated by the batch classification depicted in FIGS. 4A and 4B, in which the output file 500B includes classification information for the input file 500A of FIG. 5A. In this specific example embodiment, the output file 500B includes the same invoice description 510 and supplemental information 502-508 provided in the input file 500A, and appends additional columns to each row of the input file 500A that include the classification information generated by the classification microservice 112 for each row (and, therefore, text item). In this example embodiment, the classification information includes a taxonomy description 516 (e.g., a textual description or label) for a classification selected from a taxonomy by the classification microservice 112, a taxonomy identifier 512 for the selected classification, a display code 514 for the taxonomy description 516, a confidence level 518 for the selected classification, and a classification mapping 520 describing a mapping of the invoice description 510 to the selected classification.

In at least some example embodiments, the classification mapping 520 may include information indicating how the one or more classifiers 240 used to generate the classification information interpreted one or more portions of the text term (e.g., the invoice description 510) and/or the supplemental information (e.g., the supplier 504, the first part key 506, the second part key 508, and the like). For example, the classification mapping 520 may indicate which portions of the text term or the supplemental information were interpreted as a manufacturer, a model name/number, and so on. In some example embodiments, the classification mapping 520 may identify parts of speech (e.g. noun, modifier, etc.) that the one or more classifiers 240 generated during classification operations from which at least some of the classification information (e.g., the taxonomy description 516) was generated.

In an example embodiment, the confidence level 518 may be expressed as a particular confidence category (e.g., LOW, MID, or HIGH) instead of a more specific probability, as provided by the confidence level 310 of FIG. 3B. In some example embodiments, the output file 500B may indicate multiple possible classifications and associated information 512-520 for one or more of the text terms, such as, for example, when none of the potential classifications is associated with a high confidence level, as mentioned above in conjunction with FIG. 3B.

Figure 6:
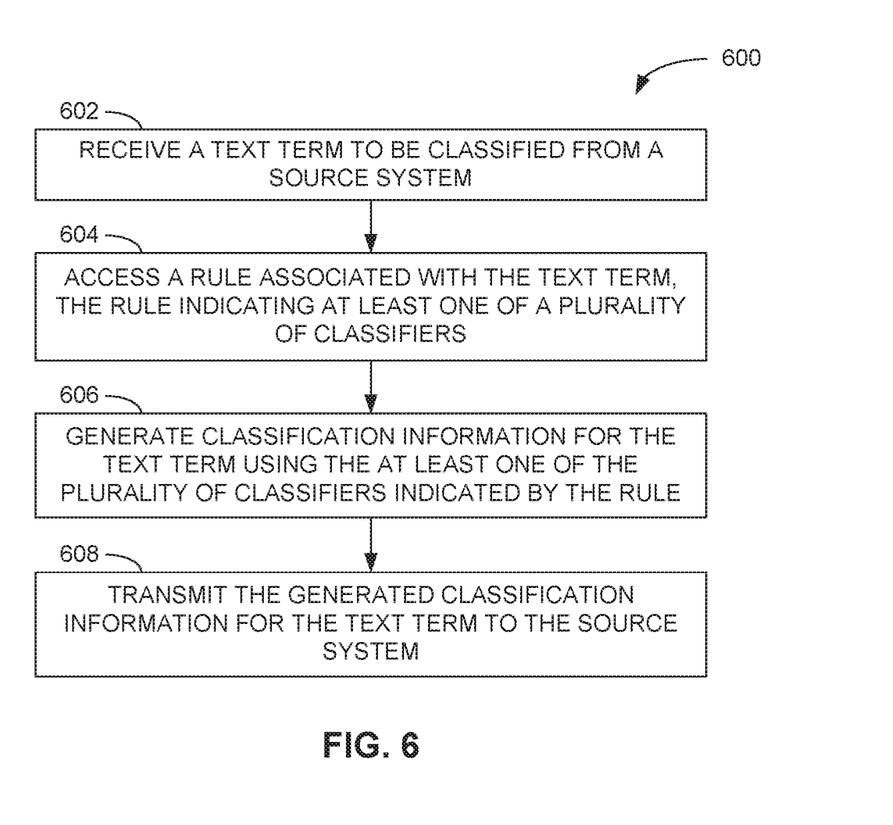
FIG. 6 is a flow diagram of an example method of classifying a text term using at least one classifier.

FIG. 6 is a flow diagram of an example method 600 of classifying a text term using at least one classifier 240. While the method 600, as well as other methods described in greater detail below, are presented herein as being performed by one or more modules 210-250 of the classification microservice 112 of FIG. 2, systems or devices other than the classification microservice 112 or the cloud system 110 may perform these methods in other example embodiments.

In the method 600, the classification microservice 112 (e.g., via the web user interface 210 and/or the REST API 230) may receive a text term (e.g., via the user interface 300A or the user interface 400A) to be classified from a source system (e.g., the client system 120 and/or the server system 125) (operation 602). The classification microservice 112 may access a rule (e.g. via a rule engine 250) associated with the text term, in which the rule indicates at least one of a plurality of classifiers (e.g., the classifiers 240) (operation 604). The classification microservice 112 may then generate classification information for the text term using the at least one of the plurality of classifiers 240 (operation 606) and transmit the generated classification information for the text term to the source system (operation 608). As indicated above, the generation of classification information may be performed in either an interactive (real-time) mode or a batch mode in some example embodiments. Moreover, a single text term or multiple text terms may be classified at a time using the classification microservice 112. Additionally, in example embodiments in which more than one classifier 240 of the classification microservice 112 is employed to generate the classification information, the multiple classifiers 240 may be employed in a serial or chained manner.

In FIG. 6, as well as other methods discussed herein, while a particular order of execution may be shown for a particular set of operations (e.g., operations 602-608), other orders of execution are also possible, including possible simultaneous, concurrent, or overlapping execution of two or more of the operations shown.

Figure 7:
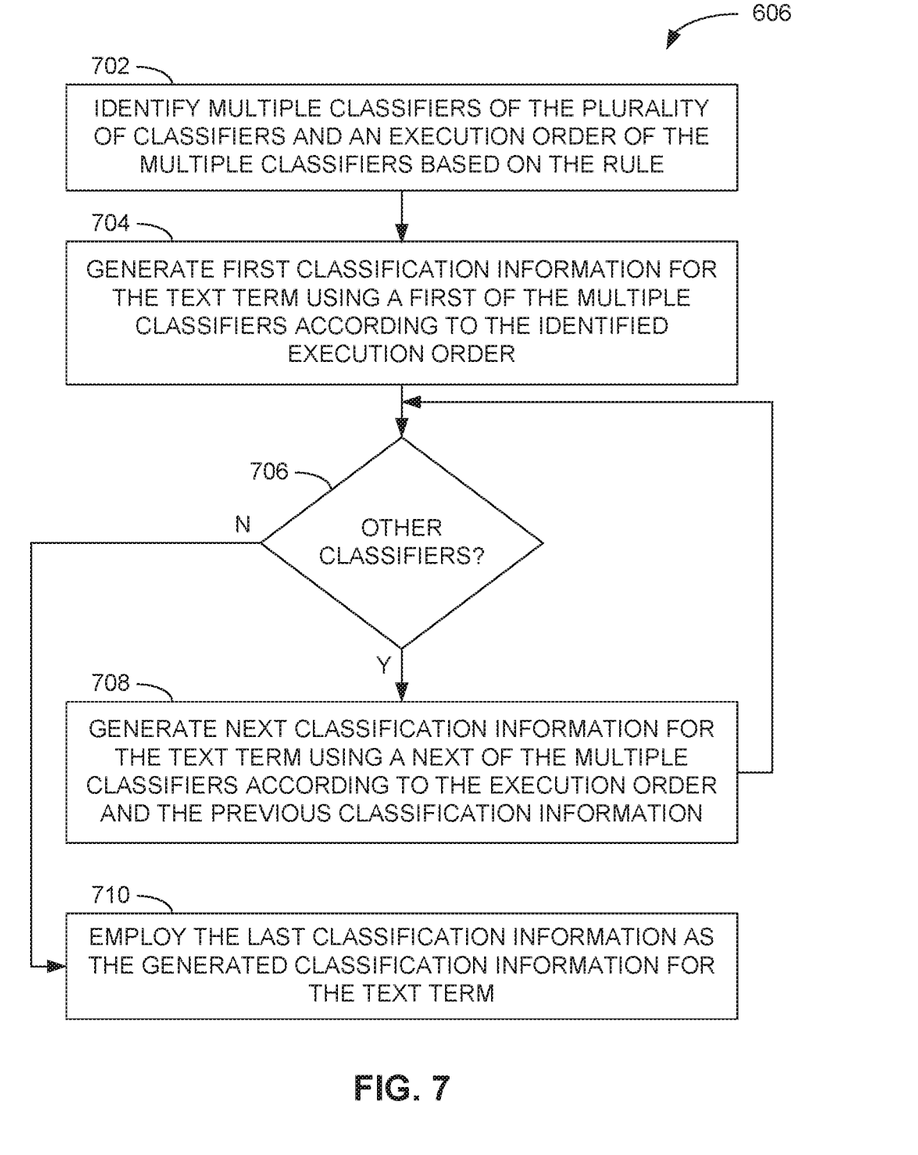
FIG. 7 is a flow diagram of an example method of generating classification data using multiple classifiers.

FIG. 7 is a flow diagram of an example of method for the operation 606 of FIG. 6 of generating classification information for a text term using multiple classifiers 240 in a serial manner. In an example embodiment of the operation 606, the classification microservice 112 may identify the multiple classifiers 240 and an execution order for the multiple classifiers 240 based on the rule associated with the text term (operation 702). The classification microservice 112 may generate first classification information for the text term using a first classifier 240 of the identified multiple classifiers 240 according to the identified execution order (operation 704). If there are others of the identified multiple classifiers 240 remaining to be employed (operation 706), the classification microservice 112 may generate next classification information using the next classifier 240 of the multiple classifiers 240 according to the execution order and the classification information generated using the previous classifier 240 (operation 708). Generation of classification information may continue in this chained manner until no other identified classifiers 240 remain, at which point the classification microservice 112 may employ the classification information generated by the last of the identified classifiers 240 in the execution order as the generated classification information for the text term (operation 710).

In an example embodiment, a method for classification comprises receiving, at a computer system from a source system via a communication network, a request comprising a text term to be classified; accessing, by the computer system, a rule associated with the text term, the rule indicating at least one classifier of a plurality of classifiers installed at the computer system; generating, using at least one hardware processor of the computer system, classification information for the text term using the at least one classifier indicated by the rule, the generated classification information comprising a classification selected by the at least one classifier from a taxonomy stored in a data store; and transmitting, from the computer system via the communication network to the source system, the generated classification information for the text term.

In another example embodiment, including all previous example embodiments, the rule is associated with the text term by way of the rule being associated with the source system.

In another example embodiment, including all previous example embodiments, the rule indicates multiple classifiers of the plurality of classifiers, and wherein the classification information for the text term is generated using the multiple classifiers.

In another example embodiment, including all previous example embodiments, the rule indicates an execution order for the multiple classifiers from a first classifier to a last classifier of the multiple classifiers, and the generating of the classification information comprises generating first classification information for the text term using the first classifier; and generating, for each remaining classifier of the multiple classifiers, next classification information for the text term using preceding classification information of a preceding classifier of the multiple classifiers; wherein the generated classification information for the text term comprises last classification information generated using the last classifier.

In another example embodiment, including all previous example embodiments, the plurality of classifiers are employed in the computer system as a microservice provided by the computer system via the communication network.

In another example embodiment, including all previous example embodiments, the receiving of the text term comprises receiving a representational state transfer (REST) application program interface (API) call, and the transmitting of the generated classification information comprises a response to the REST API call.

In another example embodiment, including all previous example embodiments, the generated classification information comprises a textual description for the selected classification.

In another example embodiment, including all previous example embodiments, the generated classification information comprises a confidence level that the selected classification is correct relative to other classifications of the taxonomy.

In another example embodiment, including all previous example embodiments, the generated classification information comprises taxonomy mapping information describing a mapping of the text term to the selected classification.

In another example embodiment, including all previous example embodiments, the request further comprises supplemental information associated with the text term.

In another example embodiment, including all previous example embodiments, the supplemental information comprises at least one of supplier information, part number information, and pricing information for an item described by the text term.

In another example embodiment, including all previous example embodiments, the request further comprises a plurality of additional text terms to be classified, and the method further comprises generating, at the computer system, classification information for each of the additional text terms using the at least one classifier indicated by the rule; and transmitting, from the computer system via the communication network to the source system, the generated classification information for each of the additional text terms.

In another example embodiment, including all previous example embodiments, the request further comprises supplemental information associated with the text term and each of the additional text terms, and the supplemental information comprises at least one of supplier information, part number information, and pricing information.

In another example embodiment, including all previous example embodiments, the request comprises a first comma-separated value (CSV) file comprising the text term, the additional text terms, and the supplemental information.

In another example embodiment, including all previous example embodiments, the transmitting of the generated classification information for the text term and the additional text terms comprises a second CSV file comprising the text term, the additional text terms, the supplemental informational, and the generated classification information for the text term and additional text terms.

In an example embodiment, a classification system comprises one or more hardware processors and a memory storing instructions that, when executed by at least one of the one or more hardware processors, cause the classification system to perform operations comprising receiving, from a source system via a communication network, a request comprising a text term to be classified; accessing a rule associated with the text term, the rule indicating at least one classifier of a plurality of classifiers installed at the data classification system; generating classification information for the text term using the at least one classifier indicated by the rule, the generated classification information comprising a classification selected by the at least one classifier from a taxonomy stored in a data store; and transmitting, via the communication network to the source system, the generated classification information for the text term.

In another example embodiment, including all previous example embodiments, the rule is associated with the text term by way of the rule being associated with the source system.

In another example embodiment, including all previous example embodiments, the rule indicates multiple classifiers of the plurality of classifiers, the rule indicates an execution order for the multiple classifiers from a first classifier to a last classifier of the multiple classifiers, and the generating of the classification information comprises generating first classification information for the text term using the first classifier; and generating, for each remaining classifier of the multiple classifiers, next classification information for the text term using preceding classification information of a preceding classifier of the multiple classifiers; wherein the generated classification information for the text term comprises last classification information generated using the last classifier.

In another example embodiment, including all previous example embodiments, the request further comprises a plurality of additional text terms to be classified and supplemental information associated with the text term and each of the additional text terms, and the operations further comprise receiving, from a source system via a communication network, a request comprising a text term to be classified; accessing a rule associated with the text term, the rule indicating at least one classifier of a plurality of classifiers installed at the data classification system; generating classification information for the text term using the at least one classifier indicated by the rule, the generated classification information comprising a classification selected by the at least one classifier from a taxonomy stored in a data store; and transmitting, via the communication network to the source system, the generated classification information for the text term.

In an example embodiment, a non-transitory computer-readable storage medium stores instructions that, when executed by one or more processors of a machine, cause the machine to perform operations comprising receiving, from a source system via a communication network, a request comprising a text term to be classified; accessing a rule associated with the text term, the rule indicating at least one classifier of a plurality of classifiers installed at the computer system; generating classification information for the text term using the at least one classifier indicated by the rule, the generated classification information comprising a classification selected by the at least one classifier from a taxonomy stored in a data store; and transmitting, via the communication network to the source system, the generated classification information for the text term.

Figure 8:
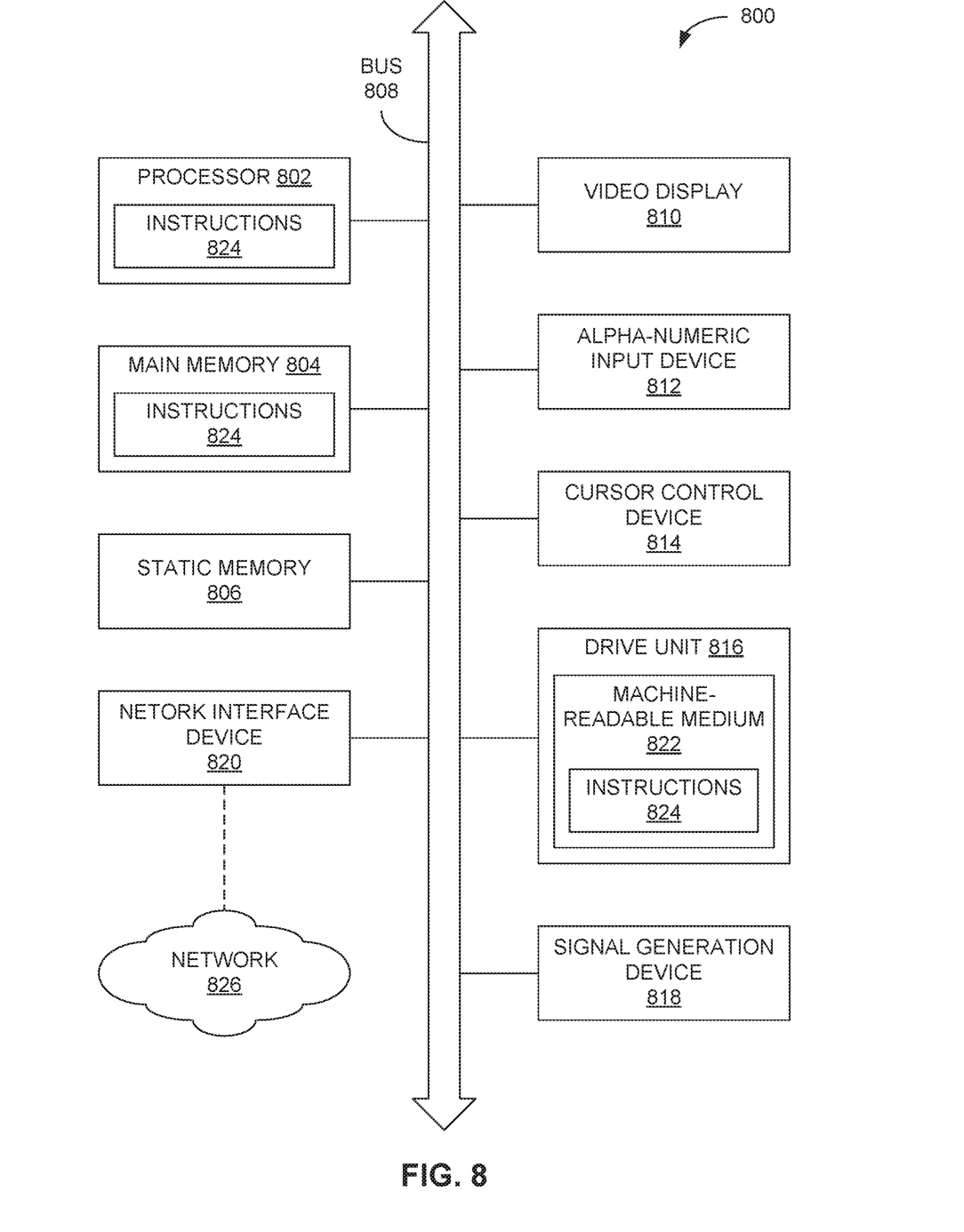
FIG. 8 is a block diagram of a computer processing system within which a set of instructions may be executed for causing a computer to perform any one or more of the methodologies discussed herein.

FIG. 8 is a block diagram of a computer processing system 800 within which a set of instructions 824 may be executed for causing a computer to perform any one or more of the methodologies discussed herein, such as those discussed in conjunction with FIGS. 6 and 7, as well as other methodologies discussed herein. In some embodiments, the computer operates as a standalone device or may be connected (e.g., networked) to other computers. In a networked deployment, the computer may operate in the capacity of a server or a client computer in a server-client network environment, or as a peer computer in a peer-to-peer (or distributed) network environment. Moreover, the computer processing system 800 may serve in example embodiments as, for example, the cloud system 110 of FIG. 1 and/or the classification microservice 112 of FIGS. 1 and 2, as well as any component or module 210-250 described therewith.

In addition to being sold or licensed via traditional channels, embodiments may also be deployed, for example, by software-as-a-service (SaaS) providers, application service providers (ASPs), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 800 includes a processor 802 (e.g., a central processing unit (CPU), a graphics processing unit (GPU), or both), a main memory 804, and a static memory 806, which communicate with each other via a bus 808. The computer processing system 800 may further include a video display 810 (e.g., a plasma display, a liquid crystal display (LCD), or a cathode ray tube (CRT)). The computer processing system 800 also includes an alphanumeric input device 812 (e.g., a keyboard), a user interface (UI) cursor control device 814 (e.g., a mouse and/or touch screen), a drive unit 816, a signal generation device 818 (e.g., a speaker), and a network interface device 820.

The drive unit 816 includes a machine-readable medium 822 on which is stored one or more sets of instructions 824 and data structures embodying or utilized by any one or more of the methodologies or functions described herein. The instructions 824 may also reside, completely or at least partially, within the main memory 804, the static memory 806, and/or the processor 802 during execution thereof by the computer processing system 800, with the main memory 804, the static memory 806, and the processor 802 also constituting tangible machine-readable media 822.

The instructions 824 may further be transmitted or received over a network 826 via the network interface device 820 utilizing any one of a number of well-known transfer protocols (e.g., Hypertext Transfer Protocol).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding, or carrying a set of instructions 824 for execution by the computer and that cause the computer to perform any one or more of the methodologies of the present application, or that is capable of storing, encoding, or carrying data structures utilized by or associated with such a set of instructions 824. The term "machine-readable medium" shall accordingly be taken to include, but not be limited to, solid-state memories, optical and magnetic media, and other non-transitory media.

While the example embodiments discussed herein are described with reference to various implementations and exploitations, these example embodiments are illustrative, and the scope of the disclosure is not so limited. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

What is claimed is:

1. A method comprising:
receiving, at a computer system from a source system via a communication network, an application program interface (API) call, the API call comprising an input file for a request, the input file comprising a plurality of text terms to be classified and supplemental information associated with the plurality of text terms;
for each text term of the plurality of text terms:
accessing, by the computer system, a rule associated with the text term, the rule indicating at least one classifier of a plurality of classifiers installed at the computer system that is associated with the text term; and
generating, by the computer system, classification information for the text term using the supplemental information and the at least one classifier indicated by the rule, the generated classification information comprising a classification for the text term that is selected by the at least one classifier from a taxonomy stored in a data store; and
transmitting, from the computer system via the communication network to the source system, a response to the API call comprising an output file containing the generated classification information for each text term of the plurality of text terms and appended information, the appended information including a confidence level that the selected classification for the text term is correct relative to other classifications of the taxonomy and a classification mapping describing a mapping of the text term to the generated classification.

2. The method of claim 1, wherein the rule is associated with the text term by way of the rule being associated with the source system.

3. The method of claim 1, wherein the rule indicates multiple classifiers of the plurality of classifiers, and wherein the classification information for the text term is generated using the multiple classifiers.

4. The method of claim 3, wherein the rule indicates an execution order for the multiple classifiers from a first classifier to a last classifier of the multiple classifiers, and wherein the generating of the classification information comprises:
generating first classification information for the text term using the first classifier; and
generating, for each remaining classifier of the multiple classifiers, next classification information for the text term using preceding classification information of a preceding classifier of the multiple classifiers;
wherein the generated classification information for the text term comprises last classification information generated using the last classifier.

5. The method of claim 1, wherein the plurality of classifiers is employed in the computer system as a microservice provided by the computer system via the communication network.

6. The method of claim 1, wherein the generated classification information comprises a textual description for the selected classification.

7. The method of claim 1, wherein the generated classification information comprises taxonomy mapping information describing a mapping of the text term to the selected classification.

8. The method of claim 1, wherein the supplemental information comprises at least one of supplier information, part number information, and pricing information for an item described by the text term.

9. The method of claim 1, wherein the supplemental information comprises at least one of supplier information, part number information, and pricing information.

10. The method of claim 1, wherein the input file comprises a first comma-separated value (CSV) file.

11. The method of claim 10, wherein the output file comprises a second CSV file comprising the generated classification information for the text term and the appended information.

12. The method of claim 1, herein the output file is an augmented version of the input file.

13. The method of claim 1, further comprising updating a user interface to reflect a status of a processing of the request, the status indicating whether the processing is complete.

14. The method of claim 1, further comprising increasing the confidence value for the selected classification for the text term based on a determination that the classification was selected via a selectable means in a user interface in which the classification was presented.

15. A classification system comprising:
one or more hardware processors; and
a memory storing instructions that, when executed by at least one of the one or more hardware processors, cause the classification system to perform operations comprising:
receiving, from a source system via a communication network, an application program interface (API) call, the API call comprising an input file for a request, the input file comprising a plurality of text terms to be classified and supplemental information associated with the plurality of text terms;
for each text term of the plurality of text terms:
accessing a rule associated with the text term, the rule indicating at least one classifier of a plurality of classifiers installed at the data classification system that is associated with the text term; and
generating classification information for the text term using the supplemental information and the at least one classifier indicated by the rule, the generated classification information comprising a classification for the text term that is selected by the at least one classifier from a taxonomy stored in a data store; and
transmitting, via the communication network to the source system, a response to the API call comprising an output file containing the generated classification information for each text term of the plurality of text terms and appended information, the appended information including a confidence level that the selected classification for the text term is correct relative to other classifications of the taxonomy and a classification mapping describing a mapping of the text term to the generated classification.

16. The classification system of claim 15, wherein the rule is associated with the text term by way of the rule being associated with the source system.

17. The classification system of claim 15, wherein the rule indicates multiple classifiers of the plurality of classifiers, wherein the rule indicates an execution order for the multiple classifiers from a first classifier to a last classifier of the multiple classifiers, and wherein the generating of the classification information comprises:

generating first classification information for the text term using the first classifier; and     generating, for each remaining classifier of the multiple classifiers, next classification information for the text term using preceding classification information of a preceding classifier of the multiple classifiers;

wherein the generated classification information for the text term comprises last classification information generated using the last classifier.

18. The classification system of claim 15, wherein the supplemental information comprises at least one of supplier information, part number information, and pricing information.

19. The classification system of claim 15, wherein the input file comprises a first comma-separated value (CSV) file.

20. A non-transitory computer-readable storage medium storing instructions that, when executed by one or more processors of a machine, cause the machine to perform operations comprising:

receiving, from a source system via a communication network, an application program interface (API) call, the API call comprising an input file for a request, the input file comprising a plurality of text terms to be classified and supplemental information associated with the plurality of text terms;

for each text term of the plurality of text terms:

accessing a rule associated with the text term and classification information for each of the additional text terms, the rule indicating at least one classifier of a plurality of classifiers installed at the computer system that is associated with the text term;

generating classification information for the text term using the supplemental information and the at least one classifier indicated by the rule, the generated classification information comprising a classification for the text term that is selected by the at least one classifier from a taxonomy stored in a data store; and     transmitting, via the communication network to the source system, a response to the API call comprising an output file containing the generated classification information for each text term of the plurality of text terms and appended information, the appended information including a confidence level that the selected classification for the text term is correct relative to other classifications of the taxonomy and a classification mapping describing a mapping of the text term to the generated classification.

\* \* \* \* \*